United States Patent
Gargas

(10) Patent No.: US 6,692,645 B1
(45) Date of Patent: Feb. 17, 2004

(54) WATER RESERVOIR FILTRATION SYSTEM AND METHOD

(75) Inventor: Joseph Gargas, 6316 Wisteria La., Apollo Beach, FL (US) 33572

(73) Assignees: Joseph Gargas, Apollo Beach, FL (US); Robert Murphy, Apollo Beach, FL (US)

( * ) Notice: Subject to any disclaimer, the term of this patent is extended or adjusted under 35 U.S.C. 154(b) by 0 days.

(21) Appl. No.: 09/699,593

(22) Filed: Oct. 30, 2000

Related U.S. Application Data

(63) Continuation-in-part of application No. 09/351,773, filed on Jul. 12, 1999, now Pat. No. 6,149,825.

(51) Int. Cl.$^7$ .............................. B01D 21/26; C02F 9/00
(52) U.S. Cl. ................. 210/788; 210/169; 210/195.1; 210/258; 210/259; 210/295; 210/299; 210/304; 210/512.1; 210/805; 210/806; 209/12.1; 209/725
(58) Field of Search ................... 210/167, 169, 210/194, 195, 258, 259, 295, 299, 304, 512.1; 209/12.1, 719, 715; 55/439.1, 337, 338

(56) References Cited

U.S. PATENT DOCUMENTS

| | | | | |
|---|---|---|---|---|
| 3,698,555 A | * | 10/1972 | Conner | 210/304 |
| 3,802,570 A | * | 4/1974 | Dehne | 209/304 |
| 3,907,686 A | * | 9/1975 | Fletcher et al. | 210/304 |
| 4,263,139 A | * | 4/1981 | Erlich | 210/169 |
| 4,306,967 A | * | 12/1981 | Trautwein | 210/167 |
| 5,599,365 A | * | 2/1997 | Alday et al. | 55/459.1 |
| 6,117,340 A | * | 9/2000 | Carstens | 210/512.1 |

* cited by examiner

Primary Examiner—David A. Reifsnyder
(74) Attorney, Agent, or Firm—Pendorf & Cutliff

(57) ABSTRACT

A water reservoir treatment system for a swimming pool, water tank, spa, or fountain water, which is simple to operate, low in maintenance, and highly reliable. The system preferably comprises, in sequence, a water circulation system, a vortex separator for initial separation of particulates, and an absorption or adsorption filter which may be a conventional pool filter using sand, diatomaceous earth, or paper cartridge as filtering medium.

7 Claims, 2 Drawing Sheets

WATER RESERVOIR FILTRATION SYSTEM AND METHOD

RELATED U.S. APPLICATION

This application is a continuation-in-part of Ser. No. 09/351,773, filed Jul. 12, 1999, entitled "TUBULAR VORTEX SEPARATOR," now U.S. Pat. No. 6,149,825, the disclosure of which is incorporated herein by reference.

BACKGROUND OF THE INVENTION

1. Field of the Invention

The present invention concerns a treatment system for a water reservoir such as swimming pool, spa, or fountain. The system is simple to operate, lower in maintenance than a conventional filtration system, and highly reliable.

2. Description of the Related Art

During the past forty years, the swimming pool has become a fixture in the backyards of increasing numbers of American homes. The water of the pool must be maintained in a clean condition so that all members of the family can safely swim. This is usually taken care of by a pool filtration and re-circulation system in conjunction with the use of chlorine or ozone.

Most solids are removed by filtering. Mechanical filters, such as charcoal filters, diatomaceous earth filters, sand filters, or paper cartridge filters have traditionally been used as the main filters for swimming pools and the like, but suffer the disadvantage that they are rapidly clogged with particulate matter and thus need to be cleaned at frequent intervals. Most conventional manually cleaned filtration systems are thus oversized to extend the amount of time between cleanings.

There is a need for a new filtration system that would reduce maintenance labor, permit use of smaller filter systems, and extend the length of time between the cleaning of the filters.

SUMMARY OF THE INVENTION

It is an object of the invention to provide a means for extending the filter/circulation system cleaning and maintenance intervals; so as to allow the owner of a pond, pool, hot tub, or fountain to dramatically cut maintenance time.

It is a further object of the invention to reduce the amount and cost of chemicals (chlorine, ozone) used to maintain water chemistry.

After extensive investigation, the present inventor came to realize that particulate matter, e.g., hair, pollen, leaves, soil, etc., consumes chemicals used to treat water. In a conventional mechanical filtration system, particles are trapped in the filter. These particles are thus held in the stream of flow of the water being treated and are continuously contacted with the water being treated, consuming chemicals until completely oxidized.

Further, as particles accumulate in the mechanical filtration system, the water flow becomes restricted and water pressure increases.

The inventor considered that it would be an advantage to remove particulate matter from the circulation system as early as possible. However, the conventional way to remove particulates—by cleaning the filter—is labor intensive, and thus is only done by the operator when absolutely necessary.

After extensive experimentation, the inventor discovered that it would be possible to assist or supplement the conventional mechanical filtration system by providing a filtration aid, which continuously removes particles from the stream of water.

More specifically, the present inventor discovered that the novel combination of (1) a vortex separator to remove particulate matter before it reaches a mechanical filter, and (2) a mechanical filter to trap any materials not removed by the vortex separator, results in a water maintenance system characterized by a very reduced maintenance.

The present invention thus concerns a filter/circulation system for a swimming pool, spa, or fountain comprising, in sequence, a pump system, wherein the mechanical filter is supplemented or assisted by a vortex separator for initial separation of larger solids and particulate matter. The mechanical filter may be a conventional pool filter using sand, diatomaceous earth, or paper cartridge as filtering medium.

In a practical embodiment of the present invention, the water reservoir treatment system comprises, in sequence, a pump system, a vortex separator, and an absorption or adsorption filter.

The foregoing has outlined rather broadly the features and technical advantages of the present invention in order that the detailed description of the invention that follows may be better understood. Additional features and advantages of the invention will be described hereinafter, which form the subject of the claims of the invention.

BRIEF DESCRIPTION OF THE DRAWINGS

For a fuller understanding of the nature and objects of the present invention, reference should be made by the following detailed description taken in with the accompanying drawings in which.

DETAILED DESCRIPTION OF THE INVENTION

Figure 1:
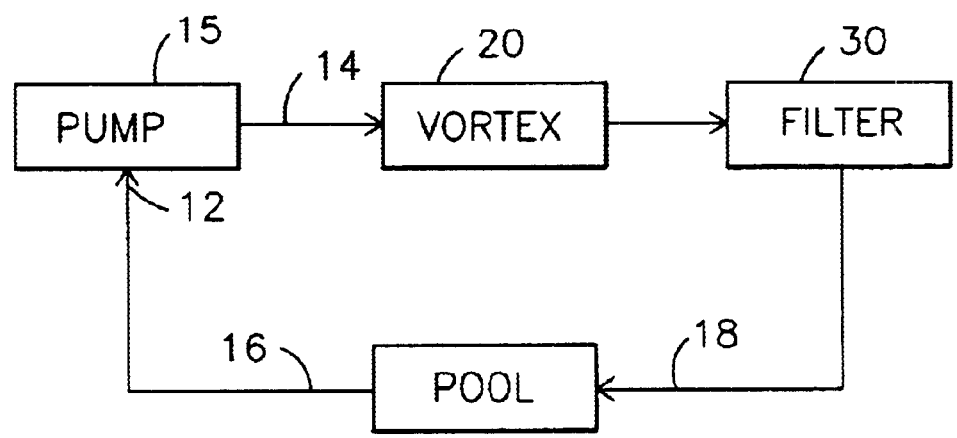
FIG. 1 schematically represents a water reservoir filtration system according to the invention.

FIG. 1 represents the water filtration system according to the invention comprising:

- a water circulation system 10 including a water pump 15 having an inlet side 12 and an outlet side 14, a water conduit 16 for conveying water from the water reservoir to the inlet side of the water pump, and a water conduit 18 for conveying water from the outlet side of the pump to the water reservoir;
- a vortex separator 20 for initial separation of larger solids and particulate matter; and
- a mechanical (adsorption or absorption) filter 30 downstream of the vortex separator. The mechanical filter may be a conventional pool filter using sand, diatomaceous earth, or a paper cartridge as filtering medium.

Water Circulation System

The water circulation system includes a water pump having an inlet side and an oultet side, a water conduit for conveying water from the water reservoir to the inlet side of the water pump, and a water conduit for conveying water from the outlet side of the pump to the water reservoir.

Any type of commercially available water pump can be used in the present invention.

Vortex Separator

A vortex separator is a device, which separates materials of different density from a fluid, which fluid may be a gas or a liquid. A vortex separator operates by creating a rapid vortex within a chamber having annular walls. The vortex may be created by stirrer blades within the chamber, or by introducing a fluid into a chamber tangentially so as to create a rapid vortex within the chamber.

It is the centrifugal force created by the vortex that causes dense particles entrained in the fluid to move toward the outside of the vortex, then down along the walls to the bottom of the vortex chamber. Fluid in the center of the vortex tends to be particle-free and can be removed.

The vortex separator is provided prior to (i.e., upstream of) the mechanical filter (e.g., adsorption or adsorption filter) in order to separate out particulates of higher density from the water before the water reaches the mechanical filter, thereby cutting down on the loading of the filter and thus not only reducing the size requirement of the filter and the chemical demand, but also extending the interval between filter changes and the life of the filter because abrasive particles such as sand can be removed in advance of contacting the filter.

It is the centrifugal force created by the direction change acceleration of the vortex that causes particles to move toward the outside of the vortex thus leaving a particle free center.

One such vortex separator, referred to as a cyclone separator, is described in U.S. Pat. No. 3,802,570 (Dehne). Dehne teaches a cyclone separator which comprises an inlet duct means for receiving a fluid stream; a hollow housing mounted and cooperating with the inlet duct means to form the fluid stream into a vortex; a particulate discharge means or collector mounted onto the exit of the hollow housing; a clean fluid outlet mounted within the upper portion of the hollow housing; and a hollow truncated cone mounted in the exit of the vortex separator.

Another suitable vortex particle separator of conventional design is described in U.S. Pat. No. 3,907,686 (Fletcher et al.). Fletcher et al. teach a vortex particle separator comprising a hollow body having a cylindrical formed upper chamber and lower trap chamber which contains a tubular member, having an opening in spaced communication with the conically tapering chamber.

A further example of a vortex separator is described in U.S. Pat. No. 5,599,365 (Alday et al.). Alday et al. teach a mechanical fluid separator comprising a fluid inlet, an annular chamber, a cone shaped baffle, and an fluid outlet.

Figure 2:
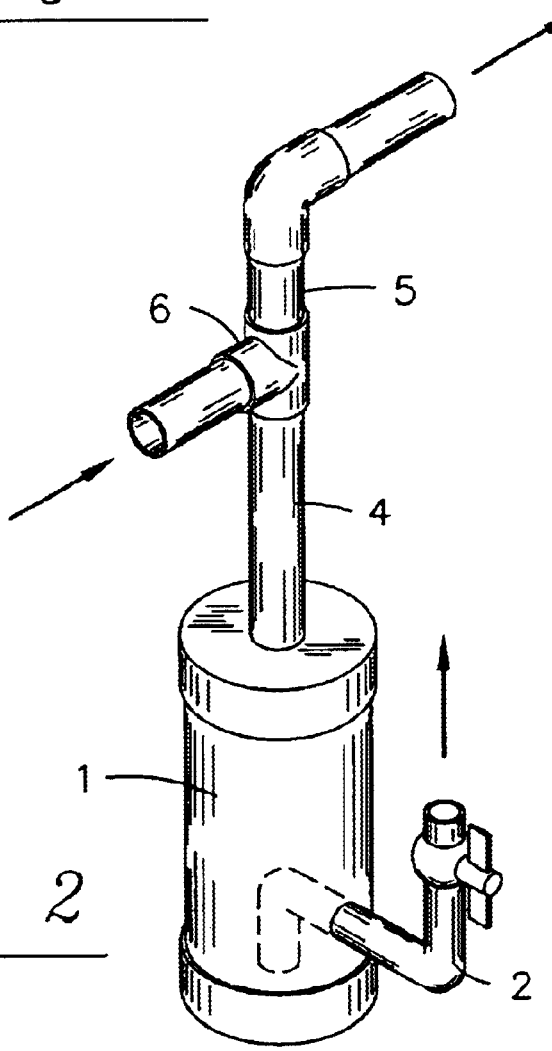
FIG. 2 is a perspective view of the tubular vortex separator connected to a collection chamber.

The vortex separator as described by Fletcher et al. or the other patents listed above can be used in the present invention. The present invention preferably employs a vortex separator, which is even simpler in design and assembled from easily obtained, conventional plumbing components, thereby reducing the cost of constructing and maintaining the system of the present invention. One such vortex separator is described in detail in U.S. patent application Ser. No. 09/351,773, filed Jul. 12, 1999, entitled "TUBULAR VORTEX SEPARATOR, now U.S. Pat. No. 6,149,825" the disclosure of which is incorporated herein by reference. In FIG. 2, the water is drawn from a source and is pumped horizontally into the vortex separator 3. The vortex separator is a generally tubular element comprising an elongated sideways T-junction. The T-junction comprises first 4 and second 5 vertical coaxial longitudinal arms and one horizontal perpendicular feed arm 6. The three arms have approximately the same internal diameter, with the first or lower longitudinal arm, measured from the center of the "T" junction to the end of the arm, having a length of six times its diameter. As the internal diameter is 2 inches, the length of the lower arm is 12 inches. The lower arm terminates in a collection chamber 1, which fills with collected matter and can be easily cleaned by draining through outlet pipe 2, which has an opening just over the floor of the collection chamber 1.

Figure 3:
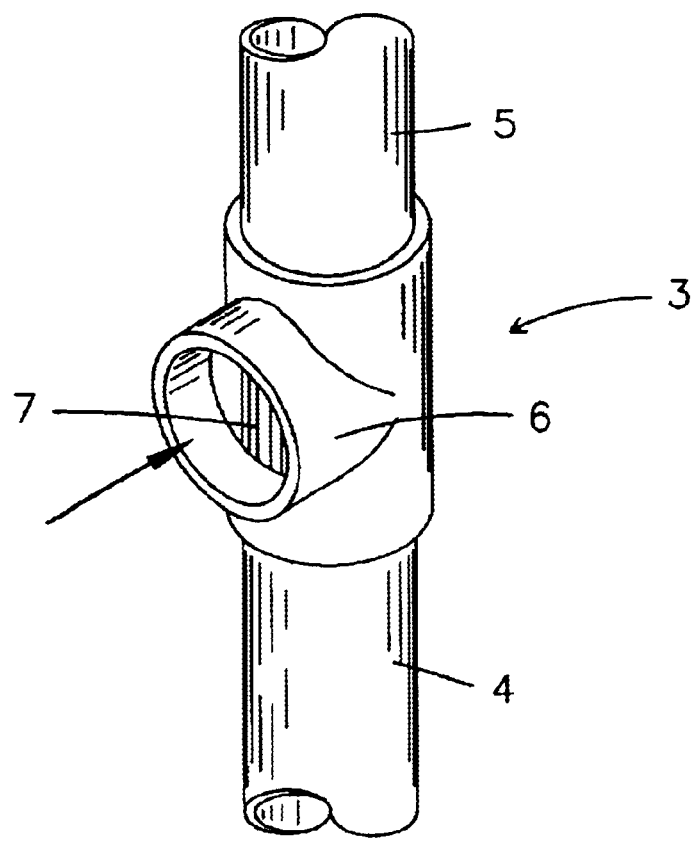
FIG. 3 is a close-up perspective view of the tubular vortex separator of FIG. 2.

In FIG. 3, the water with entrained particulate matter travels through the horizontal tangential T-junction arm 6, which opens into a vertical column. At least one half of the inlet between the horizontal or perpendicular arm and the vertical channel formed by the two longitudinal arms is blocked so as to provide a tangential inlet. That is, water from the feed arm enters the vertical channel along an annular wall, smoothly follows the wall, and is thus immediately brought into a vorticular motion.

This blocking is most easily accomplished by taking a section of pipe having an outer diameter which is the same as or slightly larger than the internal diameter of the T-junction, cutting about a three inch long section in the case of a two inch internal diameter T-junction, and cutting this section in half lengthwise so as to make two equal sections, each being arcs describing 180 degrees. One of these sections is then introduced into the longitudinal column of the T-junction and cemented in place in a manner so as to form a gate 7 blocking at least 50%, more preferably about 75%, most preferably about 85–90% of the opening between the perpendicular arm 6 and the longitudinal channel 4, 5 of the T-junction. The abrupt size reduction between the 2 inch diameter of the perpendicular pipe 5 and the inlet adjacent to the gate 7 allows for higher velocity of water, and the contour shape of the longitudinal channel within the T-junction aids in the flow and efficiency of the centrifuge that is produced, thus more particles will be removed by being forced against the annular internal side wall. Particles as small as 20 to 50 microns can be removed through this process.

Preferably, at least the leading longitudinal edge of the gate 7 is beveled or tapered so as to minimize turbulence of the water as it passes along the inner wall of the T-junction and swirls over the gate 7. Water flowing from the perpendicular arm 6 into the longitudinal channel 4, 5 of the T-junction thus enters tangentially, thereby imparting a swirling vortex flow pattern to the water inside the longitudinal channel of the T-junction.

Since the 2 inch T-junction is designed to receive and join three pipes having internal diameters of 2 inches, it is of necessity larger in inner (and outer) diameter than 2 inches. Since in the preferred embodiment of the invention, the gate 7 is made of the same 2-inch piping used in constructing the vortex separator, insertion of the gate 7 into the T-junction results in an internal dimension, which is similar to the internal diameter of the 2-inch piping.

In the Northern Hemisphere, it is preferred that the vortex generator is so designed that (looking down) the water enters on the left side of the T-junction, thereby giving it a clockwise spin. South of the Equator, it is preferred that the water enters to the right, which will give the vortex a counter-clockwise spin. This results in the vortex being aided by, rather than fighting against, the Creoles force.

Since the longitudinal channel of the T-junction is oriented vertically, and the vortex swirls about a vertical axis, particulate matter tends to be forced to the outside wall of the vertical longitudinal channel. Particulate matter drops down along the first or lower longitudinal arm 4 of the T-junction, to be collected in a trap or collection chamber 1 connected to the bottom of the lower longitudinal arm, where it is collected and later removed through drain pipe 2. Water, which tends to be free of particulate, after swirling, flows upwards and moves to the next section of the water filtration system.

Collection chamber 1 which serves as the waste collection chamber is no less than 4 inches in diameter, and may be as wide as 8 inches. The minimum height of this waste collection chamber 1 must be no less than 12 inches to avoid the likelihood of particulate mater becoming re-entrained in the water flow and exiting the column of water.

The bottom of the waste collection chamber is connected to a discharge pipe 2 of no less than 1 inch and no greater than 3 inches in diameter, which is selectively opened and closed via a valve. This valve can be opened manually or through a solenoid periodically to flush the debris that is collected in waste collection chamber 1. During operation, there is preferably no more than a 3 to 5 lb. pressure drop on the exit side of the waste collection chamber 1 in comparison to the entrance side of the centrifuge, as the difference in pressure aids in the formation of the vortex. That is, too great a pressure drop results in too rapid a longitudinal flow through the pipe and insufficient vorticular movement, and too small a pressure drop results in insufficient longitudinal and vorticular movement.

In the context of a swimming pool water filtration system, the vortex separator will remove the particulate matter that is responsible for clogging the main filter and increasing the chlorine demand, as the biodegradable substances are actually removed from the water column and end up in the collection pot due to their weight and size. This early removal of particulates will also protect the main filter against sharp objects such as gravel and grains of sand, which tend to tear or wear the cloth or laterals on a filter when they are thrust against it by the water flow. The vortex will also remove undissolved calcium in the water that tends to cause a problem with scaling, this again being done through the process of a centrifugation. Any sand present will also be removed and kept out of the system. This represents an improvement over the conventional filter, as sand readily re-enters the pool due to its weight when the regular pool filter is removed for cleaning. The sand grains just fall off as the filter is being lifted out of the filter housing, and the grains of sand just re-circulate back into the pool when the pump is re-activated—the process is repeated, and the filter will continually suffer wear and tear due to this.

The centrifuge will eliminate the need to clean the regular pool filter, which now will act as a final water-polishing filter, and in normal use, will need only to be rinsed out once or twice a season. This is attributable to the centrifuge removing all the heavy debris along with the biodegradable substances; thus there will be a negligible pressure drop on the regular pool filter over time, allowing a much longer run time before servicing (cleaning). The centrifuge will also be invaluable in new pool installation where sand and heavy debris—that can destroy filter cartridges—will be completely removed in this process.

Mechanical Filter

While the vortex separator described above can remove a large proportion of the particulate matter from water, it has been found that the effectiveness of the ozonization and chlorination chemical treatment can be optimized if the water is subjected to a further filtration prior to chemical treatment. This filtration may be by any of the filters conventionally employed in filtering of pools, such as a sand, diatomaceous earth, paper, or even carbon filter, but in practice is preferably a cartridge type paper filter.

For example, U.S. Pat. No. 4,263,139 (Erlich) teaches a filter element for a fluid circulating system primarily adapted for removing algae and other fine contaminants from swimming pool water comprising pleated filtration medium arranged in a cylindrical configuration having an open central area, a cap bonded to one end of the filtration medium to close the open central area, an adapter bonded to the opposite end of the filtration medium for connection to a flow source to direct the flow of water into the open central area for passage through the filtration medium in a direction from inside to outside, and an outer support member disposed on the exterior of the filtration medium and closed at one end and secured at the other end to the adaptor to restrain the filtration medium. The outer support comprises a multiplicity of braided criss-cross strands of metallic or non-metallic material defining a tubular structure, which is adapted to permit limited radial expansion of the filtration medium to expose the full area thereof to the flow.

The present invention is not limited to such a filter, and any of those conventionally employed in the industry can be employed herein.

In the context of a swimming pool water filtration system, the vortex separator will remove the particulate matter that is responsible for clogging the main filter and increasing the chlorine demand, as the biodegradable substances are actually removed from the water column and end up in the collection pot due to their weight and size. This early removal of particulates will also protect the main filter against sharp objects such as gravel and grains of sand, which tend to tear or wear the cloth or laterals on a filter when they are thrust against it by the water flow. The vortex will also remove undissolved calcium in the water that tends to cause a problem with scaling, this again being done through the process of a centrifugation. Any sand present will also be removed and kept out of the system. This represents an improvement over the conventional filter, as sand readily re-enters the pool due to its weight when the regular pool filter is removed for cleaning. The sand grains just fall off as the filter is being lifted out of the filter housing, and the grains of sand just re-circulate back into the pool when the pump is reactivated. The process is repeated, and the filter will continually suffer wear and tear due to this.

The vortex separator will reduce the need to frequently clean the regular pool filter, which now will act as a final water-polishing filter, and in normal use, will need only to be rinsed out once or twice a season. This is attributable to the centrifuge removing all the heavy debris along with the biodegradable substances, thus there will be a negligible pressure drop on the regular pool filter over time, allowing a much longer run time before servicing (cleaning). The centrifuge will also be invaluable in new pool installation where sand and heavy debris—that can destroy filter cartridges—will be completely removed in this process.

Although this invention has been described in its preferred form with a certain degree of particularity with respect to a swimming pool water filtration system, it is understood that the present disclosure of the preferred form has been made only by way of example, and that numerous changes in the details of structures and composition of the product may be resorted to without departing from the spirit and scope of the invention.

What is claimed is:

1. A water reservoir treatment system including:
   (a) a water circulation system including a water pump having an inlet side and an outlet side, a water conduit for conveying water from said water reservoir to the inlet side of said water pump, and a water conduit for conveying water from the outlet side of said pump to said water reservoir;

(b) a vortex separator provided in said water circulation system for separating particulate matter from said water; and (c) a mechanical filter provided downstream of said vortex separator, wherein said vortex separator is generally tubular in construction and comprises an elongated "T" junction comprising first and second vertically oriented coaxial longitudinal arms and one perpendicular horizontal arm, said arms having approximately the same internal diameter, at least said first longitudinal arm, measured from the center of said "T" junction to the end of said arm, being at least four times the internal diameter of said first longitudinal arm, wherein at least one half of the inlet between the horizontal perpendicular arm and the longitudinal arms is blocked so as to provide a tangential inlet.

2. A water reservoir treatment system as in claim 1, wherein said water reservoir is selected from the group comprising a swimming pool, a spa, a water fountain, and a water heater.

3. A water reservoir treatment system as in claim 1, wherein from 75 to 95% of said inlet is blocked.

4. A water reservoir water treatment system as in claim 1, wherein from 80 to 90% of said inlet is blocked.

5. A water reservoir water treatment system as in claim 1, wherein said vortex separator has an inlet and an outlet, and wherein the pressure drop between the vortex separator inlet and the vortex separator outlet is between 3 and 5 pounds per square inch.

6. A water reservoir treatment system as in claim 1, wherein said vortex separator comprises a fluid inlet, an annular chamber, a gate, and a fluid outlet.

7. A method for treating water drawn from a water reservoir, said method comprising:

(a) inducing a water stream in a circulation system including a water pump having an inlet side and an outlet side, a water conduit for conveying water from said water reservoir to the inlet side of said water pump, and a water conduit for conveying water from the outlet side of said pump to said water reservoir;

(b) directing said water stream through a vortex separator to separate particulate matter from said water in said vortex separator; and (c) subjecting the water stream downstream of said vortex separator and prior to returning to said water reservoir to mechanical filtration, wherein said vortex separator is generally tubular in construction and comprises an elongated "T" junction comprising first and second vertically oriented coaxial longitudinal arms and one perpendicular horizontal arm, said arms having approximately the same internal diameter, at least said first longitudinal arm, measured from the center of said "T" junction to the end of said arm, being at least four times the internal diameter of said first longitudinal arm, wherein at least one half of the inlet between the horizontal perpendicular arm and the longitudinal arms is blocked so as to provide a tangential inlet.

* * * * *